United States Patent [19]

Green

[11] 4,448,683
[45] May 15, 1984

[54] LIQUID FILTRATION SYSTEM WITH LEVEL-RESPONSIVE CONTAMINANT REMOVAL AND AIR FLOW CONTROL FOR VACUUM PRODUCER

[75] Inventor: James F. Green, Pompey, N.Y.

[73] Assignee: Filtertech Inc., Manlius, N.Y.

[21] Appl. No.: 429,386

[22] Filed: Sep. 30, 1982

[51] Int. Cl.³ .............................................. B01D 29/02
[52] U.S. Cl. ................................... 210/106; 210/120; 210/122; 210/387
[58] Field of Search .................. 210/85, 104, 106, 107, 210/120, 122, 387, 392, 399, 400, 401; 55/212, 219

[56] References Cited

U.S. PATENT DOCUMENTS

| | | | |
|---|---|---|---|
| 3,021,709 | 2/1962 | Walker et al. | 55/219 |
| 3,608,278 | 9/1971 | Greenspan | 55/212 |
| 3,618,772 | 11/1971 | Dietrick | 210/104 |
| 4,037,338 | 7/1977 | Berline | 210/122 |
| 4,137,169 | 1/1979 | El-Hindi | 210/400 X |
| 4,233,157 | 11/1980 | Miller | 210/387 |

Primary Examiner—John Adee
Attorney, Agent, or Firm—Charles S. McGuire

[57] ABSTRACT

A system for optimizing operation of liquid filtration equipment having a first electric motor for periodically removing the layer of solid contaminants on the filter media through which the liquid passes, and a second electric motor which drives a centrifugal vacuum producer to remove air from an enclosed space beneath the filter media. The filtration system is of the type wherein contaminated liquid is supplied to a tank open to the atmosphere for passage through the media, whereon solid contaminants are collected, into the underlying, enclosed space. A drop in the level of liquid in the tank, e.g., in response to removal or reduction of the layer of contaminants, allowing excess air to enter the enclosed space below the media, causes a like drop in the position of a float which is connected by a linkage means to a throttling valve interposed between the enclosed space and the vacuum producer. The throttling valve is carried on a shaft which moves in response to changes in liquid level to control the rate at which air is removed from the enclosed space beneath the media, thereby controlling the horse-power required from the vacuum producer motor. The same shaft carries a pair of cams, the selectively set rotational position of which actuate limit switches for starting and stopping of the motor which effects removal of the contaminants.

13 Claims, 7 Drawing Figures

LIQUID FILTRATION SYSTEM WITH LEVEL-RESPONSIVE CONTAMINANT REMOVAL AND AIR FLOW CONTROL FOR VACUUM PRODUCER

BACKGROUND OF THE INVENTION

The present invention relates to liquid filtration systems having centrifugal vacuum producers to maintain sub-atmospheric pressures in an enclosed space beneath a filter media from which solid contaminants are periodically removed. More specifically the invention relates to improved controls for the electric motors driving the vacuum producer and the means effecting contaminant removal in such filtration systems.

In many industrial processes, liquids are used for cooling and/or lubrication purposes in machining operations, and the like. The contaminated liquid is conducted from the area of the operation wherein it is utilized to filtration apparatus for removal of the solid foreign matter and the clean liquid is returned for further use. Although the process is essentially continuous in terms of circulation of the liquid to and from the area of use and the filtering apparatus, in most typical operations it will be found that the flow of liquid to and through the filtering apparatus, and thus the level of contaminated liquid within the apparatus, is subject to fluctuation.

A type of filtering apparatus commonly employed in applications such as just described includes a tank wherein the contaminated liquid is deposited, separated from an underlying compartment by filter means overlying an opening through which the tank communicates with the compartment. Solid particles are collected on the upper side of the liquid permeable media, forming a contaminated bed or "filter cake", which is periodically removed when its resistance to flow becomes too great to maintain at least a minimum desired flow rate of the liquid into the lower compartment.

The gravity-induced flow of liquid through the media is enhanced in such filtration apparatus by creating a sub-atmospheric pressure in the lower compartment, which is normally sealed on its uppeer side by the pool of liquid in the tank. However, as previously mentioned, the flow rate of contaminated liquid to the tank is subject to fluctuation, and the rate of flow through the media varies in accordance with the degree of filter cake build-up. Thus, when the filter cake is removed from the tank there is less resistance to flow and the level of liquid in the tank normally drops, sometimes to the point that it no longer entirely seals the opening between the tank and lower compartment.

The sub-atmospheric pressure in the lower compartment, which is therefore commonly termed a vacuum chamber, is provided by a centrifugal vacuum producer driven by an electric motor to remove air from the vacuum chamber. This type of vacuum producer will seek an equilibrium between air volume or flow rate and the sub-atmospheric pressure in the vacuum chamber. When the vacuum chamber is not sealed, as a result of the pool of liquid in the tank dropping below a certain level, air is free to enter the chamber and the vacuum producer will operate at a fast rate, demanding a high horsepower input to the electric motor.

Since the required horsepower increases with air flow, to cover all conditions of operations requires large horsepower motors which are utilized to full capacity only at infrequent intervals. On the other hand, if the vacuum producer is driven by an electric motor having a horsepower rating in line with that required for normal operation when the vacuum chamber is essentially sealed by the pool of liquid in the tank, the motor would become overloaded when the liquid level drops to or below a certain level. One present means of dealing with this problem is to place a fixed restriction in the line between the vacuum changer and vacuum producer to limit the rate at which air will be withdrawn when the liquid level in the tank is too low to maintain the sealed condition of the vacuum chamber. Although the restriction may be adjustable, it obviously cannot provide an optimum balance between the rate of air removal from the vacuum chamber and the horsepower demand on the vacuum producer motor under all conditions of operation.

The filter cake is removed by a second electric motor which moves either a liquid permeable membrane (disposable or reuseable) or an apron type conveyor which scrapes the contaminants from the surface of a stationary media or strainer, for example, the type commonly known as "wedge-wire." This motor is intermittently operated in response to signals which are in some manner related to the degree of filter cake build-up on that portion of the media which is in filtering position. For example, some filtration systems of this type utilize switches responsive to the pressure differential above and below the media for starting and stopping the contaminant removal drive motor since this differential increases in proportion to the resistance to liquid flow provided by the filter cake. Other systems employ switches responsive to the level of liquid in the upper compartment, which rises as the filter cake builds up and increasingly restricts the flow of liquid through the media. In any case, the controls will have a certain deadband, which is usually fixed once the system has been installed, for starting and stopping the motor at certain spaced values of pressure differential, liquid level, etc. The upper and lower limits, i.e., the deadband, of commonly available controls of this type may produce undesirably wide fluctuations in filtering efficiency.

It is a principal object of the present invention to provide novel and improved liquid filtration apparatus having single element movable in response to the level of contaminated liquid in an upper tank to control both starting and stopping of the drive motor for removing contaminants from the tank and the horsepower demanded of the vacuum producer motor which evacuates air from a lower, enclosed compartment which receives the filtered liquid.

Another object is to provide a control system for the contaminant removal drive motor in a liquid filtration system which may be quickly and easily adjusted to provide starting and stopping of the motor at any desired levels of contaminated liquid in the receiving tank.

An additional object is to provide, in a liquid filtration system having upper and lower compartments separated by a filtering media and a vacuum producer for evacuating air from the lower compartment to maintain a sub-atmospheric pressure therein, novel means for preventing overloading of the vacuum producer motor during conditions of normally high operating demands without interruption in operation.

Another object is to provide means responsive to the level of contaminated liquid in filtration equipment for controlling the volume of air handled by apparatus for producing sub-atmospheric pressures in the filtered liquid compartment to prevent overloading of an electric motor driving such apparatus.

A further object is to provide novel and improved means for varying the volume of air pumped by a vacuum producer from the vacuum chamber of liquid filtration apparatus having an open-topped contaminated liquid tank separated from the vacuum chamber by a layer of fluid-permeable filter media.

A still further object is to provide apparatus for preventing the overloading of an electric motor used in liquid filtration equipment which conveniently incorporates elements for performing other functions in connection with operation of such equipment.

In a more general sense, the object of the invention is to provide means which improve the operation of liquid filtration apparatus, allowing the vacuum producer to operate with a smaller motor while maintaining its required performance, and permitting selective "fine-tuning" of the media drive motor controls.

Other objects will in part be obvious and will in part appear hereinafter.

SUMMARY OF THE INVENTION

In accordance with the foregoing objects, the invention contemplates a filtration system wherein a float which follows the level of contaminated liquid in the upper compartment is connected through suitable linkage means to a shaft mounted for rotation about its longitudinal axis. The shaft passes through an enclosed duct through which the lower, enclosed compartment, or vacuum chamber, of the filtration system communicates with the centrifugal vacuum producer. This portion of the shaft within the duct carries a butterfly-type damper valve and a portion outside the duct carries a plurality of rotary cams which are contacted by followers connected to individual switches. Thus, the rotational position of the shaft, as determined by the level of the contaminated liquid and float, controls the position of the damper valve and cams.

The valve is moved progressively from fully open toward closed position to restrict the volume rate at which air is evacuated by the vacuum producer, and thus the horsepower required from the motor, as the liquid level and float drop. The switches which are controlled by separate cams and followers serve to start and stop operation of the motor which drives the mechanism for moving the filter media. The rotary positions of the cams relative to the shaft are selectively adjustable, thereby permitting close control of the movement of filter media, or other removal of the contaminant bed, relative to the level of contaminated liquid. Since the efficiency of the filtration and the flow rate of liquid vary with the degree of filter cake build-up on the media, this permits selective control of filtration efficiency within virtually any desired limits while avoiding the cost of mounting hardware and physical modifications to the system commonly associated with prior art media drive controls.

DETAILED DESCRIPTION

Figure 1:
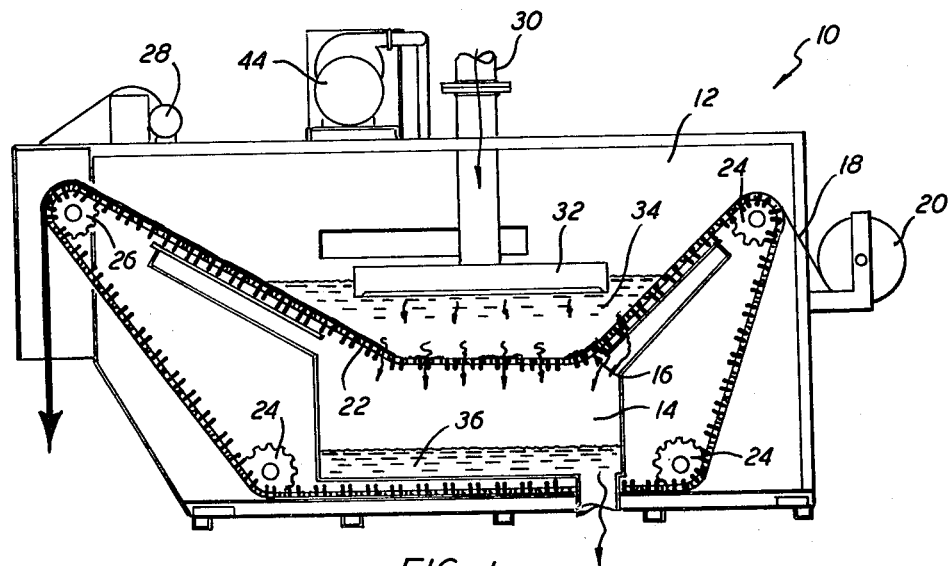
FIG. 1 is a somewhat diagrammatic, side elevational view, in vertical section, of filtration apparatus incorporating the invention.
Figure 2:
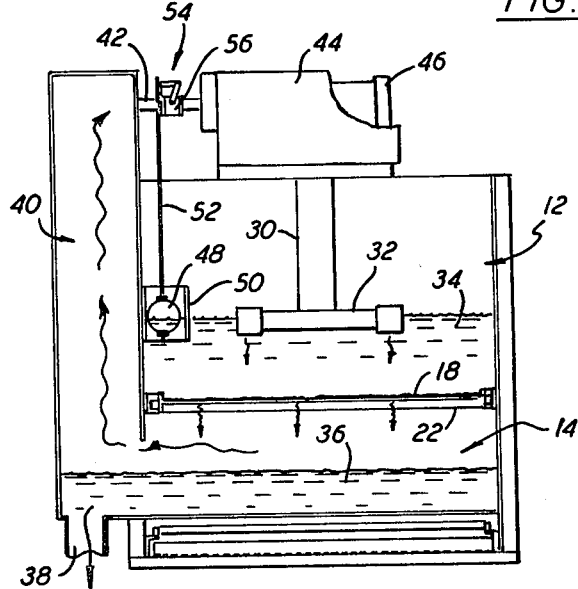
FIG. 2 is an end elevational view of the filtration apparatus of the filtration apparatus of FIG. 1, also in vertical section.

Referring now to the drawings, in FIGS. 1 and 2 is shown a typical form of liquid filtration apparatus currently in widespread commercial use, an example being that shown in U.S. Pat. No. 4,137,169 of applicant's assignee. The apparatus is denoted generally by reference numeral 10 and includes an upper, open-topped tank 12 and a lower, enclosed chamber or compartment 14. Tank 12 and chamber 14 communicate through opening 16 which is covered by liquid-permeable filtering means, whereby contaminated liquid from an industrial operation deposited in tank 12 will pass through the filtering means leaving solid particles on the upper surface thereof with clean liquid collecting in chamber 14. The filtering means may take any of a number of conventional forms, including stationary filters such as those known as "wedge-wire" filters from which collected contaminants are removed by moving scraper bars, and movable sheets of porous filter media which may be disposable or reused after removal of the contaminants.

Although for purposes of the present invention any conventional filtering means may be employed, and the term "media" is intended to include stationary strainers as well as movable membranes, apparatus 10 is shown as using filter media 18 which is supplied from roll 20 and moved by and upon an open mesh support structure 22 which is arranged in a continuous loop for movement about sprockets 24. One of the sprockets, denoted by reference numeral 26, is driven by motor 28 to move support structure 22 and media 18 to provide fresh media over opening 16. While it is desirable to have at least some solid contaminants deposited on the upper surface of media 18, since filtering efficiency is enhanced by such "filter cake", as it is commonly termed, it is necessary to move or index the media periodically when the cake layer becomes too thick to allow the passage of liquid at least at some desired minimal rate.

Contaminated liquid is supplied from the operation wherein it is utilized, for example, to cool and lubricate tools and workpieces and to carry away unwanted materials generated by the operation and other foreign matter, through pipe 30 and deposited in tank 12 by means of header 32 which distributes the contaminated liquid more evenly within the tank. Thus, a pool of contaminated liquid 34 is contained within open-topped tank 12 for passage through media 18 and opening 16, the clean liquid 36 being deposited in chamber 14, from which it is withdrawn for return to and reuse in the industrial operation through pipe 38.

Figure 3:
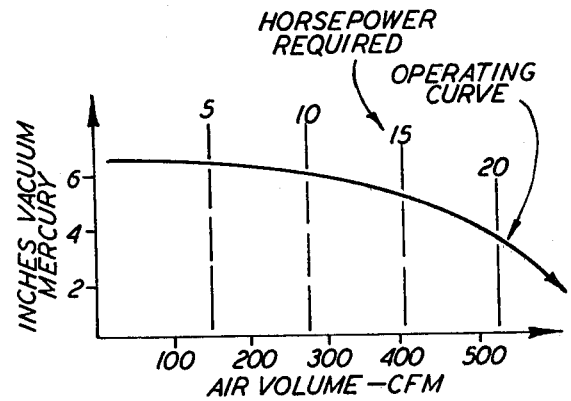
FIG. 3 is a graph showing an operating characteristic of an element of the filtration apparetum.

In order to assist and accelerate the flow of liquid through the filter cake and media, it is the usual practice to create a sub-atmospheric pressure in chamber 14, which is therefore commonly termed a vacuum chamber. To this end, chamber 14 is enclosed and connected via air plenum 40 and line 42 to a so-called "vacuum producer" comprising a centrifugal blower 44 driven by electric motor 46, which operates to exhaust air from chamber 14 in a continuous manner. This type of vacuum producer, which is standard in the industry, will seek an equilibrium between the flow rate of air being exhausted and the pressure in the vacuum chamber. As the pressure increases, air will be exhausted at a faster rate in an attempt to lower the pressure to or toward the desired sub-atmospheric level. Such a condition occurs when the level of contaminated liquid 34 drops to some degree, due to an interruption in the supply thereof to tank 12 or, more commonly, because of movement of filter media 18 to place fresh media over opening 16. The fresh media and temporary lack of a filter cake thereon offers little resistance to flow of the liquid, the level of which consequently drops, often to the extent that it no longer entirely covers opening 16. As a result, the pool of contaminated liquid in tank 12 no longer serves to seal chamber 14 and air is drawn in rapidly through the exposed media. This, of course, results immediately in a high increase of air flow through the vacuum producer, toward the right-hand side of the curve of FIG. 3, with accompanying increase of the horsepower demand from motor 46.

All of the elements and operating characteristics thus far described are typical of filtration apparatus currently in commercial use. The present invention, as previously explained, is concerned with controlling the horsepower demanded of the vacuum producer motor, permitting operations with smaller, less expensive motors while maintaining the required performance. The ensuing description deals with construction and operation of the preferred embodiment as employed in conjunction with filtration systems such as those of the foregoing description.

Figure 4:
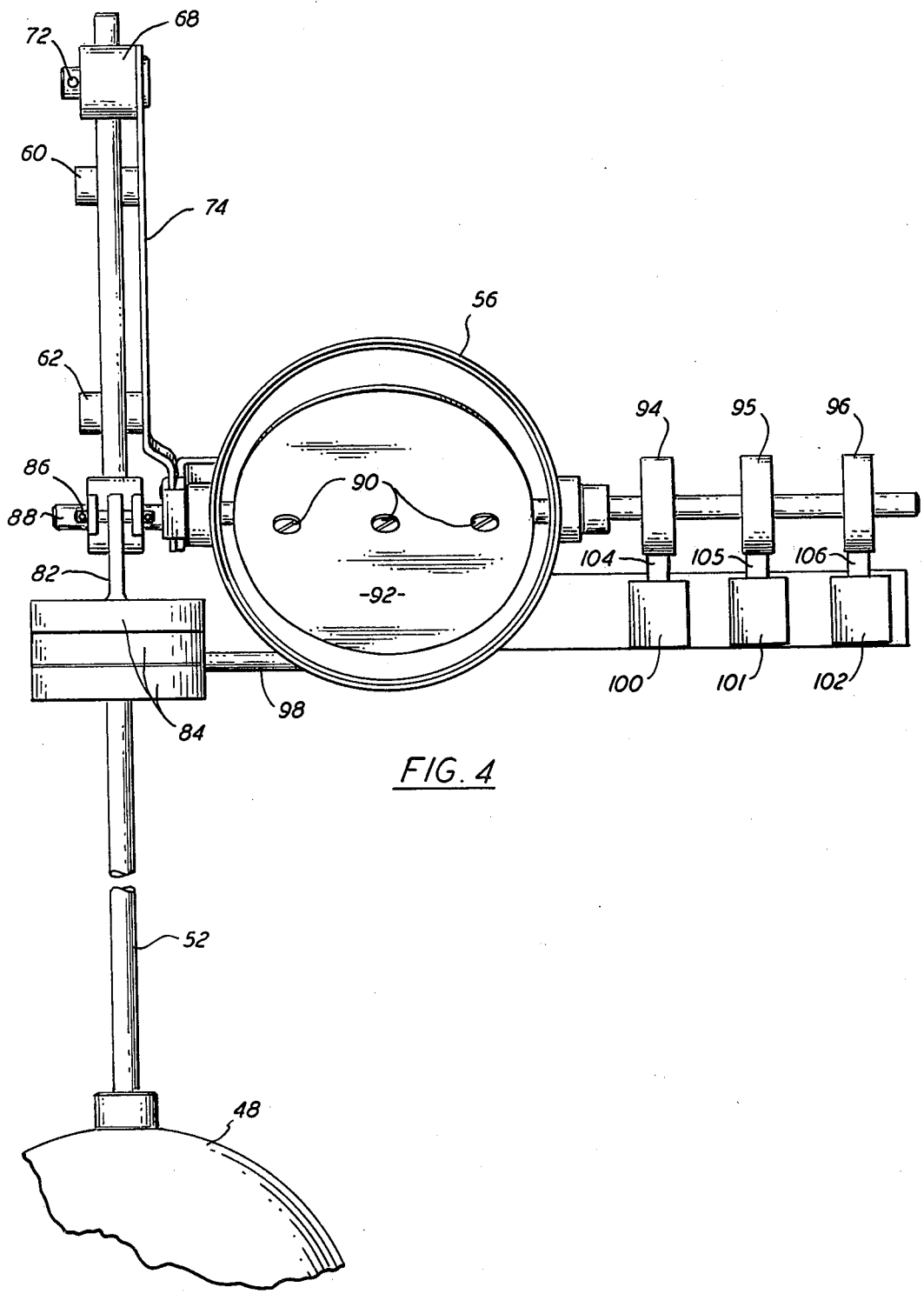
FIG. 4 is a front elevational view of a portion of the apparatus of FIG. 1, showing in more detail the elements with which the invention is directly concerned.
Figure 5:
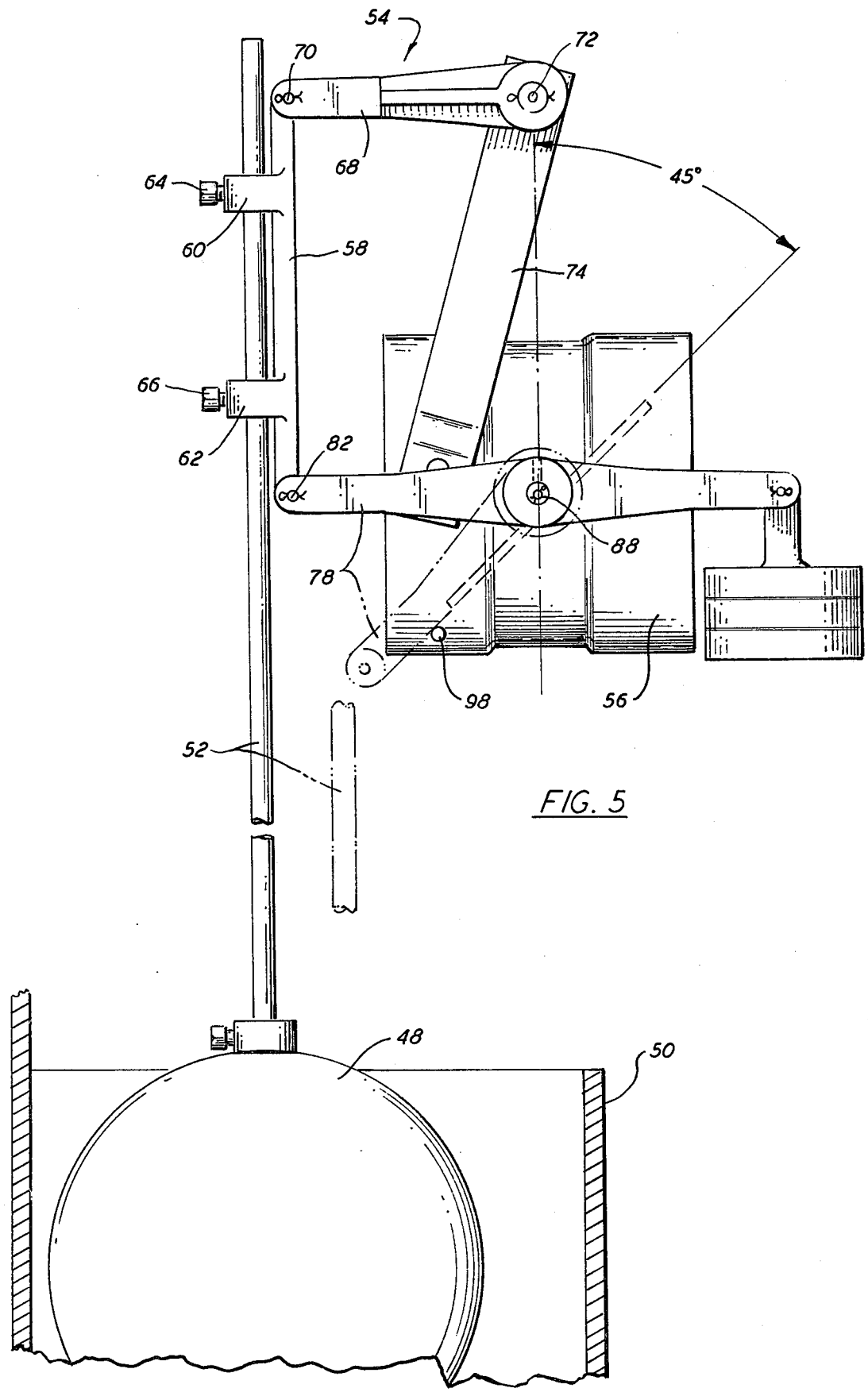
FIG. 5 is a side elevational view of the elements of FIG. 4.
Figure 6:
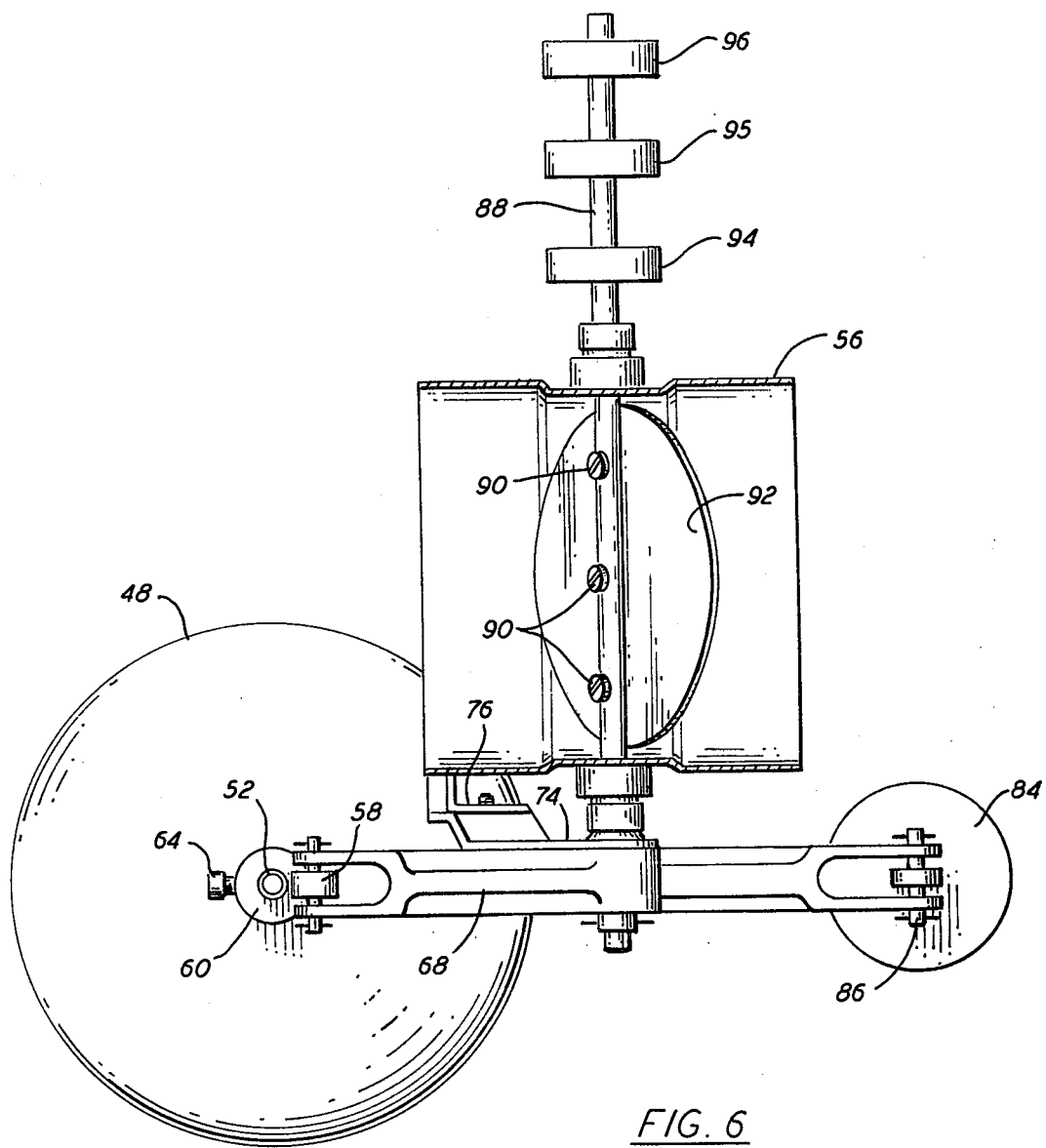
FIG. 6 is a plan view of the elements of FIGS. 4 and 5.

In FIGS. 1 and 2 it will be noted that float ball 48 is positioned within tank 12 for vertical movement in response to changes in the level of contaminated liquid 34. Float ball 48 is preferably positioned within a so-called "stilling well" defined by an encircling wall, a section of which is indicated by reference numeral 50, in order to prevent waves or splashes in other portions of tank 12 from causing erratic movement or operation and limits lateral movement of float ball 48. Rod 52 extends upwardly from float ball 48 to a linkage mechanism indicated generally by numeral 54, associated with hollow, cylindrical slip section 56, forming a portion of line 42 extending between air plenum 40 and centrifugal blower 44. This portion of the apparatus is shown in greater detail in FIGS. 4–6, to which reference is now made.

Bar 58 includes integral collars 60 and 62 which encircle float rod 52 and are secured thereto by set screws 64 and 66, respectively. Link 68 is pivotally connected at one end by pin 70 to the upper end of bar 58. The opposite end of link 68 is mounted for pivotal movement about pin 72, extending from the upper end of rigid brace 74 which is fixedly mounted at its lower end upon support 76 on slip section 56. Linkage 54 is completed by arm 78 which is pivotally attached at its opposite ends to the lower end of bar 58 by pin 80, and to support arm 82 for counterweights 84 by pin 86. Arm 78 is mounted for pivotal movement about its center upon shaft 88, which passes through section 56, and is fixedly attached thereto for transmitting rotation of arm 78 to shaft 88.

Connected to shaft 88 by means of nuts and bolts 90 within section 56 is circular plate 92, of diameter slightly less than section 56, which thus forms a butterfly-type throttling valve within air line 42. The portion of shaft 88 extending outside section 56 on the opposite side thereof from linkage 54 carries rotary cams 94, 95 and 96. Thus, the position of plate 92, as well as of cams 94, 95 and 96, is responsive to the level of liquid 34 in tank 12. The rotational orientation of cams 94, 95 and 96 upon shaft 88 is selectively adjustable, for example, by frictional engagement or by means of set screws passing through the cams and engaging the shaft; whereby the level of contaminated liquid in the tank and consequently the float position is selectively related to the cams positions. Float rod 52 and attached bar 58 will follow the vertical movement of float ball 48, with consequent rotation of arm 78 and shaft 88. A parallelogram linkage is formed by the connection of link 68 to bar 58, the exes of pins 72 and 88 being vertically aligned, whereby the entire assembly is rotatable about the axis of pin 72 on rigid link 74. This, of course, produces some lateral movement of float ball 48 and rod 52, the parts being shown in solid lined at approximately the midpoint position of the float, and a fragment of rod 52 and arm 78 being shown in dot-dash lines at the lower limit. Arm 78 rotates approximately 90° between the upper and lower extremes of the float position, wherein plate 92 is essentially horizontal and vertical, respectively. Fixed stop 98 extends from section 56 for contact by arm 78 to limit the extent of downward movement of float ball 48, thereby insuring that it does not drop so low as to contact and interfere with operation of the media support conveyor system.

Limit switches 100, 101 and 102 are positioned adjacent cams 94, 95 and 96, respectively, on any convenient support means (not shown) for operation by followers 104, 105 and 106 which ride upon the cam surfaces. Limit switch 102 is connected to actuate the drive motor for the media conveyor when the liquid level and float ball rise to pre-determined point, thereby rotating shaft 88 and the associated cams to a position where the media conveyor drive motor is actuated, as explained later in more detail. A second limit switch 101 stops the drive motor when the pool of contaminated liquid has fallen to a predetermined level, thereby rotating shaft 88 and the associated cams to a predetermined point. The third limit switch 100, operated by cam 94, actuates a separate, high-level indicating alarm. Traditionally, such functions have been provided by level switches operated by separate floats, mounting hardware, etc.

Figure 7:
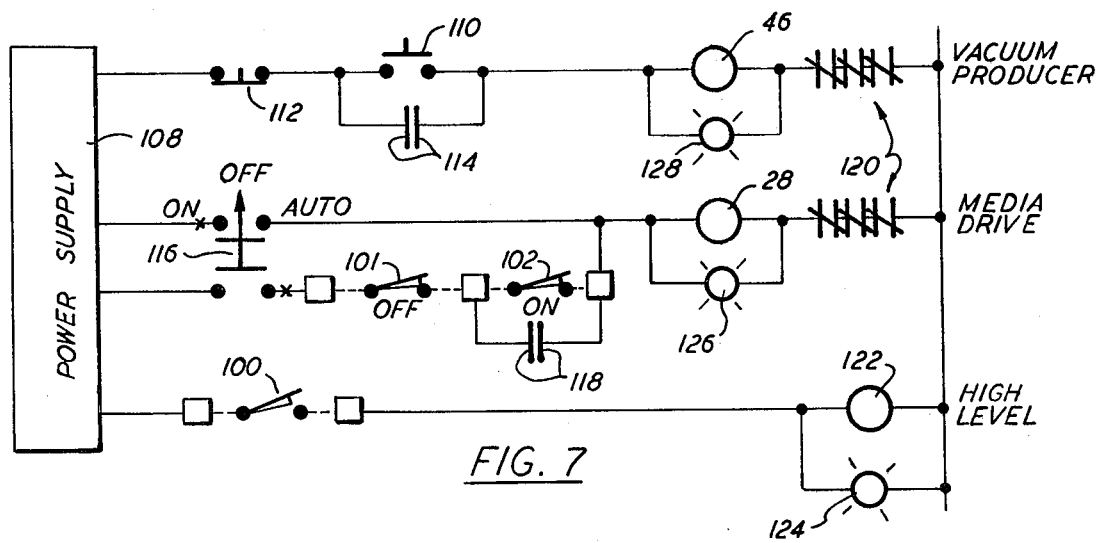
FIG. 7 is a schematic wiring diagram.

A simple schematic diagram of the electrical system for operation the filtration apparatus in the manner described is shown in FIG. 7. The three lines for actuating the vacuum producer, media drive and high level indicator are connected to appropriate terminals of an AC power supply 108. A pair of manually actuated, momentary contact, push button switches 110 and 112 are positioned in the line between the power supply and vacuum producer motor 46 for respectively starting and stopping operation thereof. Closure of start switch 110 closes a pair of contacts 114 which actuate the starter of motor 46, maintaining the motor in operation until the circuit is momentarily opened by operation of stop switch 112.

A manually operated selector switch 116 is interposed in the line to media drive motor 28 to allow selective manual on/off control or to provide automatic control in the manner described in accordance with the level of contaminated liquid in the tank. Limit switches 101 and 102 are both closed to start operation of motor 28 when the liquid level rises to a predetermined point, where the position of float 48 acts throuh the linkage as previously described to close limit switch 102, with switch 101 remaining closed. This provides power to actuate the starter of media drive motor 28 and to close contacts 118 of a holding relay. Switch 102 will open as soon as the liquid level has dropped a small amount as fresh media is moved into filtering position and presents less resistance to fluid flow, but, since contacts 118 remain closed, motor 28 will continue to operate until both switches 101 and 102 are opened. When the liquid level has dropped to the desired, predetermined level switch 101 opens to stop media drive motor 28, thereby also opening relay contacts 118. Switch 101 closes as soon as the liquid level has risen by a small amount, and motor 28 will again be actuated when the level has risen sufficiently, whereby the operational sequence is repeated as the liquid level rises and falls.

Although the motors themselves may be operated by different voltages, the starters for each may be actuated in conventional manner by a 120 v AC power supply. The vacuum producer motor in a typical installation may be, for example, a 460 v AC motor delivering 20 HP at 3600 RPM. Media drive motors normally range from ½ to 3 HP at 1750 RPM, depending on the requirements of the particular system. Motors 28 and 46 are protected against overloading by conventional thermally operated controls 120.

Limit switch 102 is interposed in a line between power supply 108 and means for providing an indication that the level of contaminated liquid in tank 12 is higher than a desired maximum. Closure of limit switch 100 provides power to actuate red warning light 124 and control relay 122 which causes an audible alarm (not shown) to sound. Amber lamps 126 and 128 are also provided on the system control panel to indicate when motors 28 and 46, respectively, are in operation.

From the foregoing description it may be seen that the present invention provides an effective means for preventing overloading of the vacuum producer drive motor by positioning a damper valve (plate 92) in blocking position within the line (42) between the air plenum (40) and the centrifugal blower (44) when the vacuum chamber (14) is subject to free air inlet due to a drop in the level of contaminated liquid (34) in the upper tank (12). Such positioning of plate 92 allows only a limited amount of air to be handled by the vacuum producer, thereby limiting the horsepower demand from motor 46, during periods of operation which could otherwise overload the motor. At the same time, and with the same operational element, the media indexing and high level indicating functions are provided.

What is claimed is:

1. A liquid filtration system including apparatus for limiting the horsepower required from an electric motor driving a centrifugal vacuum producer which operates to evacuate air from an enclosed chamber, said filtration system comprising:

(a) a tank for receiving contaminated liquid from an industrial process and having a lower wall incorporating permeable filter media through which the liquid passes for removal of solid contaminants by collecting thereof on the upper surface of the media;

(b) means for removing said contaminants from said media surface;

(c) an enclosed chamber below said tank for receiving filtered liquid passing through said media with an air space above;

(d) a centrifugal vacuum producer positioned in a line communicating with said air space and operable to evacuate air therefrom to produce a sub-atmospheric pressure within said enclosed chamber;

(e) an electric motor operatively connected to said vacuum producer;

(f) a throttling valve interposed in said line between said air space and said vacuum producer and movable between open and closed positions to control the rate at which air is evacuated by said vacuum producer, and thereby the horsepower required from said electric motor;

(g) float means positioned in said tank for movement in response to the level of said contaminated liquid therein; and (h) linkage means connecting said float means to said throttling valve to move the latter toward said open position thereof in response to increases, and toward said closed position thereof in response to decreases in the level of said contaminated liquid.

2. The invention according to claim 1 and further including an additional electric motor periodically operable to remove said solid contaminants from said upper media surface within said tank in response to the level of said contaminated liquid.

3. The invention according to claims 1 or 2 wherein said linkage means includes a shaft rotatable about its longitudinal axis and carrying both said valve and means for controlling actuation and deactuation of said additional electric motor.

4. The invention according to claim 1 wherein said throttling valve comprises a butterfly-type damper positioned in a circular cross section line between said air space and said vacuum producer.

5. The invention according to claim 4 and further including fixed stop means positioned to prevent downward movement of said float beyond a predetermined point.

6. The invention according to claim 5 wherein said linkage means includes a parallelogram linkage.

7. The invention according to claim 6 wherein said parallelogram linkage includes an arm connected to a shaft extending transversely to said arm and carrying said damper.

8. The invention according to claim 7 and further including means carried by said shaft for initiating and stopping movement of a movable filter media.

9. The invention according to claim 8 wherein said means carried by said shaft comprise at least one rotary cam.

10. A control system for actuating and deactuating an electric motor for starting and stopping, respectively, movement of means for removing solid contaminants from the portion of a liquid filtering media underlying a pool of contaminated liquid in a filter tank in accordance with the level of said liquid, said system comprising:

(a) a float positioned in said tank for vertical movement in response to changes in the level of said contaminated liquid;

(b) an elongated shaft operatively connected to said float for rotation about its longitudinal axis in response to vertical movement of said float;

(c) at least two rotary cams carried by and rotated with said shaft in selectively fixed rotational orientation thereto; and (d) an individual limit switch movable between open and closed positions in response to the rotational position of an associated one of each of said cams;

(e) two of said switches being connected in the power supply line controlling operation of said electric motor to provide actuation and deactuation thereof in response to simultaneous closing and opening, respectively, of said two switches, whereby both starting and stopping of movement of said contaminant removal means may be selectively related to any desired upper and lower level of said contaminated liquid by said selective orientation of said cams upon said shaft.

11. The invention according to claim 10 and further including a third rotary cam carried by and rotated with said shaft in selectively fixed rotational orientation thereto and an associated limit switch movable to a closed position to provide an observable alarm indicating a rise in the level of said contaminated liquid above a predetermined maximum level.

12. The invention according to claim 10 wherein said operative connection of said float to said shaft comprises a parallelogram linkage.

13. The invention according to claim 10, 11 or 12 wherein said two switches are connected in series between a power supply and the starter for said electric motor.

* * * * *